United States Patent
Schuetz et al.

(10) Patent No.: US 12,407,632 B2
(45) Date of Patent: Sep. 2, 2025

(54) TRAINING A BOT ORCHESTRATOR FOR CHATBOTS

(71) Applicant: SAP SE, Walldorf (DE)

(72) Inventors: Sebastian Schuetz, Mannheim (DE); Johannes Knoll, Mannheim (DE)

(73) Assignee: SAP SE, Walldorf (DE)

( * ) Notice: Subject to any disclaimer, the term of this patent is extended or adjusted under 35 U.S.C. 154(b) by 554 days.

(21) Appl. No.: 17/845,297

(22) Filed: Jun. 21, 2022

(65) Prior Publication Data

US 2023/0412530 A1    Dec. 21, 2023

(51) Int. Cl.
*G06F 17/27* (2006.01)
*G06F 18/214* (2023.01)
*G06F 40/35* (2020.01)
*H04L 51/02* (2022.01)

(52) U.S. Cl.
CPC ............ *H04L 51/02* (2013.01); *G06F 18/214* (2023.01); *G06F 40/35* (2020.01)

(58) Field of Classification Search
CPC .. G06F 18/214; G06F 40/35; G06F 16/90332; G10L 15/1815; H04L 51/02
USPC .......................................................... 704/9
See application file for complete search history.

(56) References Cited

U.S. PATENT DOCUMENTS

2019/0273701 A1*  9/2019  Basheer .................. H04L 51/02
2020/0342032 A1* 10/2020  Subramaniam ... G06F 16/90332
2021/0012245 A1*  1/2021  Singaraju ................ H04L 51/04

OTHER PUBLICATIONS

Cer, D et al., "Universal Sentence Encoder," arXiv: 1803.11175v2 [cs.CL], 7 pages, Apr. 12, 2018.
Iyyer, M. et al., "Deep Unordered Composition Rivals Syntactic Methods for Text Classification," Proc. of the 53rd Annual Meeting of the Association for Computational Linguistics and the 7th Int'l Joint Conf. on Natural Language Processing, pp. 1681-1691, Beijing, China, 2015.
Lee, L.H. et al., "An enhanced Support Vector Machine classification framework by using Euclidean distance function for text document categorization," Appl Intell 37, pp. 80-99, 2012.
Li, B. and Han, L., "Distance Weighted Cosine Similarity Measure for Text Classification," IDEAL 2013, LNCS 8206, pp. 611-618, 2013.
Niwattanakul, S. et al., "Using of Jaccard Coefficient for Keywords Similarity," Proc. of the Int'l MultiConference of Engineers and Computer Scientists 2013 vol. I, 6 pages, 2013.

(Continued)

*Primary Examiner* — Md S Elahee
(74) *Attorney, Agent, or Firm* — Sterne, Kessler, Goldstein & Fox P.L.L.C.

(57) ABSTRACT

Disclosed herein are system, method, and computer program product embodiments for training a bot orchestrator for chatbot selection. An embodiment operates by collecting a set of expressions from training data sets of a plurality of chatbots. For each pair of expressions, the embodiment calculates a mathematical distance between an expression for a first chatbot in the respective pair of expressions and an expression for a second chatbot in the respective pair of expressions. The embodiment filters the set of expressions based on the calculated mathematical distances, thereby generating a filtered set of expressions. The embodiment then trains a machine learning-based classification model of the bot orchestrator using the filtered set of expressions.

20 Claims, 4 Drawing Sheets

(56) References Cited

OTHER PUBLICATIONS

Schutz, S. and Knoll, J., "Automatic Training Data Harmonization for Bot Orchestrators in Digital Assitants," 18 pages, Feb. 2022.
Stucki, T. and D'Onofrio, T., "Architectural Patterns for Multi-Chatbot Environments: Bot Orchestrator and Alternatives," HMD (2020) 57, pp. 1187-1205, 2020.

* cited by examiner

TRAINING A BOT ORCHESTRATOR FOR CHATBOTS

BACKGROUND

Many dialog systems combine multiple different and isolated chatbots into one comprehensive digital assistant. A bot orchestrator may be responsible for managing all these chatbots. For example, the bot orchestrator may determine which of the chatbots is best-fitted to respond to a user's input. The bot orchestrator may make this decision using a machine learning-based classification model (also referred to as a metabot model) which is trained using the training data sets of the individual chatbots. For example, the training data set of the metabot model may be created by aggregating the expressions for the intent classification of the individual chatbots. The resulting data set may then be labeled by the chatbot from which the expressions originated.

But this approach often results in the bot orchestrator selecting the wrong chatbot in response to a user's input. This may be because the metabot model is trained with unharmonized data. This often occurs because the training data sets of the individual chatbots do not fit together very well for a digital assistant scenario. For example, the training data sets can contain doubled or similar expressions if multiple chatbots are designed to work in similar scenarios. Moreover, a training data set for a chatbot can also contain expressions which are unrelated to the main functionality of the chatbot such as small talk.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for training a bot orchestrator for chatbot selection.

Figure 1:
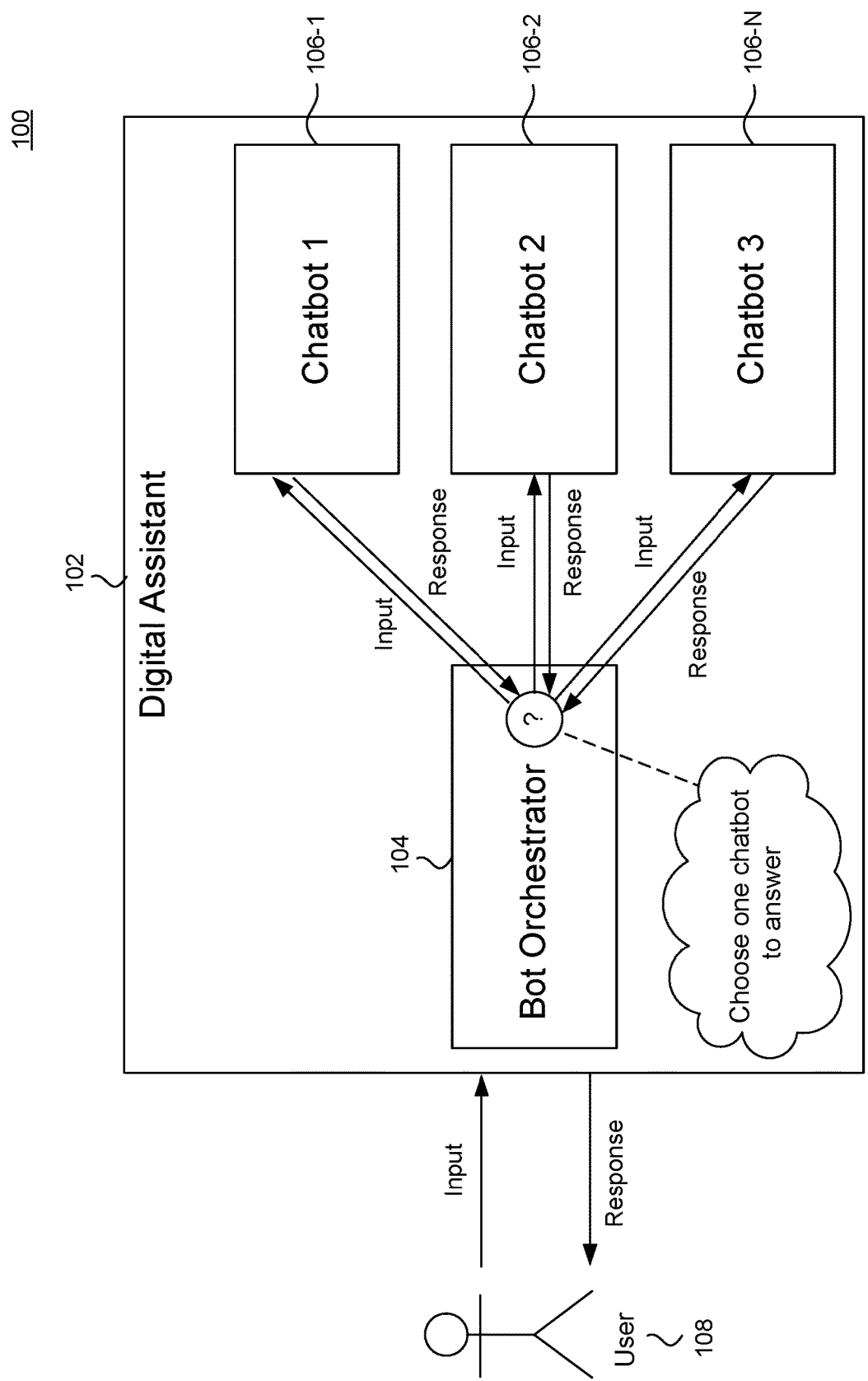
FIG. 1 is a block diagram of a system for deciding which one of a plurality of chatbots is best-fitted to respond to a user's input, according to some embodiments.

FIG. 1 is a block diagram of a system 100 that decides which one of a plurality of chatbots 106 is best-fitted to respond to a user 108's input, according to some embodiments. System 100 can include digital assistant 102. Digital assistant 102 can include bot orchestrator 104 and one or more chatbots 106. System 100 can be implemented on a desktop computer, server, laptop, tablet, smartphone, or other device as would be appreciated by a person of ordinary skill in the art. System 100 can also be implemented on a virtual machine, container, cloud computing platform, or other software platform as would be appreciated by a person of ordinary skill in the art.

Bot orchestrator 104 may be responsible for managing the one or more chatbots 106. Bot orchestrator 104 may receive an input from user 108. User 108 may be a person. User 108 may also be another software system. In response to receiving the input from user 108, bot orchestrator 104 may determine which of the chatbots 106 is best-fitted to respond to the input. Bot orchestrator 104 may make this decision using a machine learning-based classification model (also referred to as a metabot model) which is trained using the training data sets of the individual chatbots 106. Bot orchestrator 104 may then route the input to the determined chatbot 106. In response, bot orchestrator 104 may receive a response from the determined chatbot 106. Bot orchestrator 104 may output the response to user 108.

Figure 2:
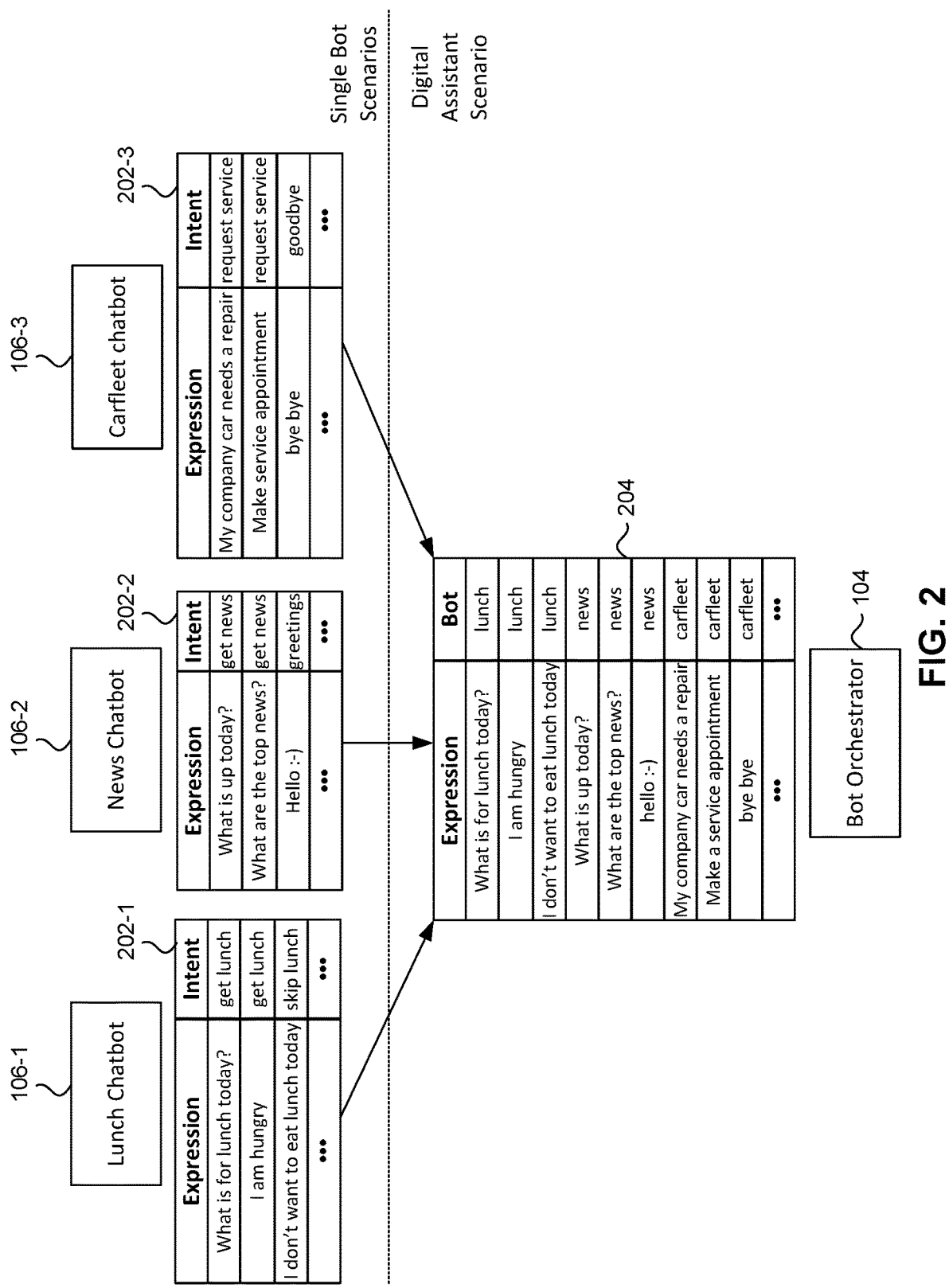
FIG. 2 is an example of aggregating training data sets for individual chatbots to create a training data set for a machine learning-based classification model, according to some embodiments.

The training data set of the machine learning-based classification model may be created from the training data sets of the individual chatbots 106. FIG. 2 is an example of aggregating training data sets for individual chatbots to create a training data set for a machine learning-based classification model, according to some embodiments. FIG. 2 is described with reference to FIG. 1.

FIG. 2 includes chatbots 106-1, 106-2, and 106-3. FIG. 2 further includes training data sets 202-1, 202-2, and 202-3. FIG. 2 further includes training data set 204 for a machine learning-based classification model for bot orchestrator 104.

Each chatbot 106 may be tailored to a separate problem domain. For example, chatbot 106-1 may be a lunch chatbot. Chatbot 106-1 may provide lunch related information in response to an input from user 108. Chatbot 106-2 may be a news chatbot. Chatbot 106-2 may provide news related information in response to an input from user 108. Chatbot 106-3 may be a carfleet chatbot. Chatbot 106-3 may provide car related information in response to an input from user 108.

Each chatbot 106 may have a separate training data set. For example, training data set 202-1 may be the training data set for chatbot 106-1. Training data set 202-2 may be the training data set for chatbot 106-2. And training data set 202-3 may be the training data set for chatbot 106-3.

Each training data set 202 may include one or more (expression, intent) pairs. An expression may be a possible input to the corresponding chatbot 106. An intent may be a function or task performed by the corresponding chatbot 106. For example, training set 106-1 may include the expression "What is for lunch today?" for chatbot 106-1. This expression may be associated with the intent "get lunch." Thus, chatbot 106-1 may perform the function "get lunch" in response to the input "What is for lunch today?" Similarly, training set 106-2 may include the expression "What are the top news?" for chatbot 106-2. This expression may be associated with the intent "get news." Thus, chatbot 106-2 may perform the function "get news" in response to the input "What are the top news?" And training set 106-3 may include the expression "My company car needs a repair" for chatbot 106-3. This expression may be associated with the intent "request service." Thus, chatbot 106-3 may perform the function "request service" in response to the input "My company car needs a repair."

In response to an input from user 108, bot orchestrator 104 may select a particular chatbot 106 among a plurality of chatbots 106 based on a machine learning-based classification model trained using training data set 204. Training data set 204 may be created by aggregating the training data sets of each of the plurality of chatbots 106. For example, trained data set 204 may be created by aggregating the training data sets of chatbots 106-1, 106-2, and 106-3.

During the aggregation process, each expression from each individual training data set 202 may be added to training data set 204 along with an indication of the corresponding chatbot 106 that handles that expression. For example, the expression "What is for lunch today?" may be added to training data set 204 along with an indication that chatbot 106-1 handles that expression. Similarly, the expression "What are the top news?" may be added to training data set 204 along with an indication that chatbot 106-2 handles that expression. And the expression "My company car needs a repair" may be added to training data set 204 along with an indication that chatbot 106-3 handles that expression.

This aggregation process may work well where a single developer develops digital assistant 102. However, this aggregation process may not work well where different chatbots 106 are developed by separate and isolated developers. For example, one technological problem associated with this approach is that bot orchestrator 104 may select the wrong chatbot 106 in response to user 108's input. This may be because the machine learning-based classification model for bot orchestrator 104 may be trained with unharmonized data in training data set 204.

There may be unharmonized data in training data set 204 because the training data sets 202 of the individual chatbots 106 often do not fit together very well for a digital assistant scenario. The training data sets 202 may contain doubled or similar expressions where multiple chatbots 106 are designed to work in similar scenarios. For example, the expression "What is new today?" may be used by chatbot 106-1 to ask for the lunch and by chatbot 106-2 to ask for the current news. Moreover, a training data set 202 for a chatbot 106 can also contain expressions which are unrelated to the main functionality of the chatbot 106 such as small talk.

To solve this technological problem, embodiments herein harmonize the data in a training data set for a machine learning-based classification model of a bot orchestrator. For example, embodiments herein harmonize the data in the training data set for the machine learning-based classification model by filtering training data sets from individual chatbots. Embodiments herein may filter the training data sets by removing double, similar, or unrelated expressions before adding the expressions to the training data set for the machine learning-based classification model. Embodiments herein then train the machine learning-based classification model of the bot orchestrator using filtered training data set.

To harmonize data in training data set 204 for the machine learning-based classification model for bot orchestrator 104, system 100 may collect a set of expressions from all (or a portion) of the training data sets associated with chatbots 106. For example, in FIG. 2, system 100 may collect a set of expressions from training data sets 202-1, 202-2, and 202-3.

After collecting the set of expressions, system 100 may compare pairs of expressions with mathematical distance measures. For example, system 100 may compare each expression of a chatbot 106 to all expressions of all other chatbots 106. In other words, system 100 may not compare the expressions of one individual chatbot 106 against other expressions of the same chatbot 106.

System 100 may compare a pair of expressions by calculating a mathematical distance between an expression of a first chatbot 106 and an expression of a second chatbot 106. System 100 may calculate the mathematical distance between the expression of the first chatbot 106 and the expression of the second chatbot 106 using various techniques.

System 100 may calculate the mathematical distance between the expression of the first chatbot 106 and the expression of the second chatbot 106 using a Jaccard distance. To compute the Jaccard distance, system 100 may first compute the Jaccard similarity of the expression of the first chatbot 106 and the expression of the second chatbot 106. The Jaccard similarity can represent the similarity of the two expressions.

The Jaccard similarity can represent the ratio between the number of elements (e.g., words) occurring identically in both expressions and the total number of elements (e.g., words) occurring in both expressions. System 100 can compute the Jaccard similarity as follows:

$$J(A, B) = \frac{|A \cap B|}{|A \cup B|}$$

In the above example, A can represent the expression of the first chatbot 106 and B can represent the expression of the second chatbot 106. The resulting Jaccard similarity value can range from 0 and 1.

To compute the Jaccard distance between the expression of the first chatbot 106 and the expression of the second chatbot 106, system 100 can subtract the Jaccard similarity value from 1. In other words, system 100 can compute the Jaccard distance as follows:

$$d_J(A, B) = 1 - J(A, B)$$

In the above example, dJ(A, B) can represents the Jaccard distance between A and B, where A can represent the expression of the first chatbot 106 and B can represent the expression of the second chatbot 106.

System 100 may also calculate the mathematical distance between the expression of the first chatbot 106 and the expression of the second chatbot 106 using a Euclidean distance. To compute the Euclidean distance, system 100 may first transform both expressions into vectors using sentence embedding. For example, system 100 may transform the expression of the first chatbot 106 into a first vector and the expression of the second chatbot 106 into a second vector.

System 100 may transform the expressions into vectors using various sentence embedding techniques. For example, system 100 may transform the expressions into vectors using a sentence encoder (e.g., Google LLC's Universal Sentence Encoder). The sentence encoder may represent each expression as a 512-dimensional vector of floating-point numbers.

The sentence encoder may generate a vector from an expression using a 3-step process. First, the sentence encoder may generate an embedding for each word and each bigram of the expression. Second, the sentence encoder may average the embeddings into a single vector. Finally, the sentence encoder may process the single vector using a feedforward artificial neural network, thereby obtaining the final vector for the expression. Once system 100 has transformed the expressions into vectors, system 100 can calculate the mathematical distance between the vector for the first chatbot 106 and the vector for the second chatbot 106 using a Euclidean distance. System 100 can compute the Euclidean distance between the vector for the first chatbot 106 and the vector for the second chatbot 106 as follows:

$$d(y, x) = \sqrt{\sum_{i=1}^{n}(y_i - x_i)^2}$$

In the above example, d(y, x) can represent the Euclidean distance between y and x, where y can represent the vector of the first chatbot 106 and x can represent the vector of the second chatbot 106.

System 100 may also calculate the mathematical distance between the expression of the first chatbot 106 and the expression of the second chatbot 106 using a cosine distance. To compute the cosine distance, system 100 may first transform both expressions into vectors using sentence embedding. For example, as discussed above, system 100 may transform the expression of the first chatbot 106 into a first vector and the expression of the second chatbot 106 into a second vector using a sentence encoder.

To compute the cosine distance, system 100 may first compute the cosine similarity of the vector of the first chatbot 106 and the vector of the second chatbot 106. The cosine similarity can represent the distance between two vectors based on the angle between them.

System 100 can compute the cosine similarity as follows:

$$\cosine(\vec{u}, \vec{v}) = \frac{\vec{u} \cdot \vec{v}}{|\vec{u}| \cdot |\vec{v}|} = \frac{\sum_{i=1}^{n} u_i \cdot v_i}{\sqrt{\sum_{i=1}^{n} u_i^2} \cdot \sqrt{\sum_{i=1}^{n} v_i^2}}$$

In the above example, u can represent the vector of the first chatbot 106 and v can represent the vector of the second chatbot 106. The resulting cosine similarity value can range from −1 (e.g., meaning exactly opposite) to 1 (e.g., meaning exactly the same).

To compute the cosine distance between the vector of the first chatbot 106 and the vector of the second chatbot 106, system 100 can subtract the cosine similarity value from 1. In other words, system 100 can compute the cosine distance as follows:

$$\text{cosine distance}(\vec{u}, \vec{v}) = 1 - \cosine(\vec{u}, \vec{v})$$

In the above example, cosine distance($\vec{u}$, $\vec{v}$) can represent the cosine distance between u and v, where u can represent the vector of the first chatbot 106 and v can represent the vector of the second chatbot 106.

System 100 may also calculate the mathematical distance between the expression of the first chatbot 106 and the expression of the second chatbot 106 by first transforming both expressions into vectors using sentence embedding. System 100 can then calculate the mathematical distance between the vector of the first chatbot 106 and the vector of the second chatbot 106 using various similarity statistics as would be appreciated by a person of ordinary skill in the art.

After comparing the pairs of expressions (e.g., by calculating mathematical distances for each pair of expressions), system 100 can filter the set of expressions based on the comparison. For example, system 100 can filter the set of expressions based on the calculated mathematical distances. System 100 can filter the set of expressions based on the calculated mathematical distances using a fully automated approach. System 100 can also filter the set of expressions based on the calculated mathematical distances using a semi-automated approach.

System 100 can filter the set of expressions based on the calculated mathematical distances using a fully automated approach. System 100 can first determine whether a calculated mathematical distance for a pair of expressions is below a threshold value. The threshold value may be set by system 100 or by an administrator of system 100. The threshold value may be set to balance the accuracy of selection of a chatbot 106 against possible exclusions of valuable expressions. If so, system 100 can remove at least one of the expressions from the set of expressions, thereby generating a filtered set of expressions. If the goal is to have an optimal and clear separation between the expressions of chatbots 106, system 100 can remove both expressions in the pair of expressions from the set of expressions. If the goal is that certain areas of expressions should be covered by a dedicated chatbot 106 (e.g., a dedicated chatbot to handle small talk), system 100 can remove a single expression in the pair of expressions from the set of expressions. System 100 may remove the single expression in the pair of expressions from the set of expressions based on the single expression's corresponding chatbot 106 having a lower priority (e.g., lower priority value) than the other chatbot 106 corresponding to the other expression in the pair of expressions.

System 100 can also filter the set of expressions based on the calculated mathematical distances using a semi-automated approach. System 100 can first rank each pair of expressions based on their respective calculated mathematical distance. For example, system 100 can rank a pair of expressions having a lower calculated mathematical distance than another pair of expressions as having a higher priority than the other pair of expressions. System 100 can then output the ranked pairs of expressions to a user. System 100 can then filter the set of expressions based on input from the user (e.g., based on a decision from the user).

System 100 can train a machine-learning-based classification model (also referred to as a metabot model) using the filtered set of expressions. System 100 may train the machine-learning-based classification model using the filtered set of expressions using various training algorithms as would be appreciated by a person of ordinary skill in the art.

After system 100 trains the machine-learning-based classification model, system 100 can route, using bot orchestrator 104, an input from user 108 to a chatbot 106 based on the trained machine learning-based classification model.

Figure 3:
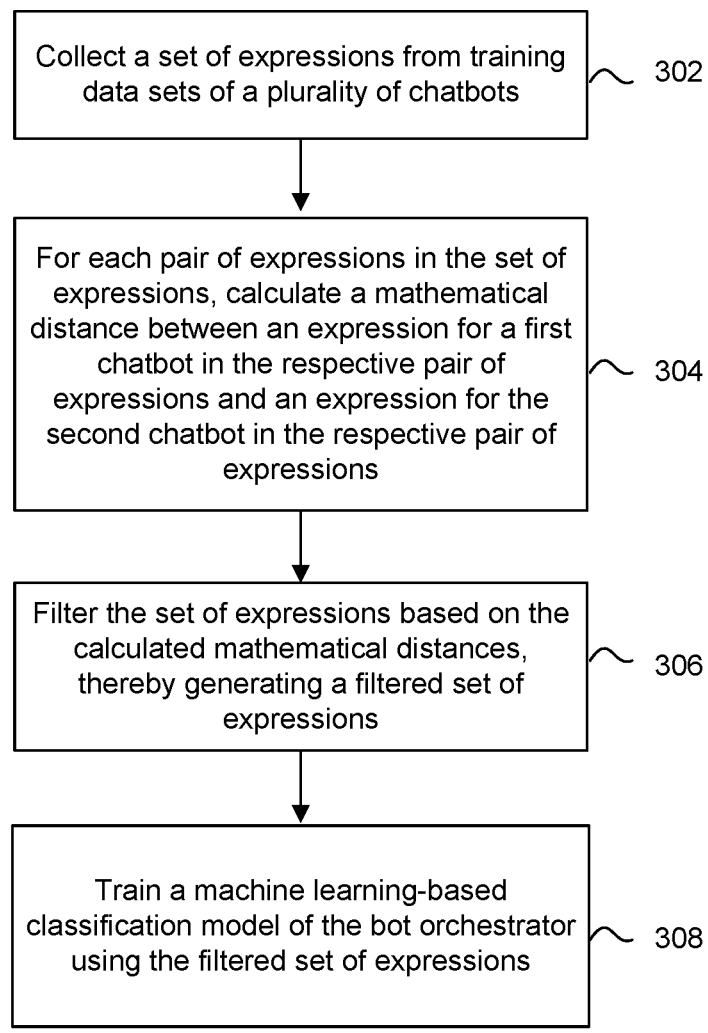
FIG. 3 is a flowchart illustrating a process for training a bot orchestrator for chatbot selection, according to some embodiments.

FIG. 3 is a flowchart for a method 300 for training a bot orchestrator for chatbot selection, according to an embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIGS. 1 and 2. However, method 300 is not limited to that example embodiment.

In 302, system 100 collects a set of expressions from training data sets of a plurality of chatbots 106. System 100 may collect the set of expressions from training data sets of all chatbots 106. System 100 may also collect the set of expressions from training data sets of a portion of the plurality of chatbots 106. System 100 may collect the set of expressions for a portion of the chatbots 106 where system 100 is attempting to configure bot orchestrator 104 to accurately route an input from user 108 to one chatbot 106 among the portion of chatbots 106.

In 304, for each pair of expressions in the set of collected expressions, system 100 calculates a mathematical distance between an expression for a first chatbot in the respective pair of expressions and an expression for a second chatbot in the respective pair of expressions. System 100 may calculate the mathematical distance between the expression of the first chatbot 106 and the expression of the second chatbot 106 using various techniques.

For example, system 100 may calculate the mathematical distance between the expression of the first chatbot 106 and the expression of the second chatbot 106 using a Jaccard distance. To compute the Jaccard distance, system 100 may first compute the Jaccard similarity of the expression of the first chatbot 106 and the expression of the second chatbot 106. To compute the Jaccard distance between the expression of the first chatbot 106 and the expression of the second chatbot 106, system 100 can then subtract the Jaccard similarity value from 1.

System 100 may also calculate the mathematical distance between the expression of the first chatbot 106 and the expression of the second chatbot 106 using a Euclidean distance. To compute the Euclidean distance, system 100 may first transform both expressions into vectors using sentence embedding. For example, system 100 may transform the expressions into vectors using a sentence encoder. Once system 100 has transformed the expressions into vectors, system 100 can calculate the mathematical distance between the vector for the first chatbot 106 and the vector of the second chatbot 106 using a Euclidean distance.

System 100 may also calculate the mathematical distance between the expression of the first chatbot 106 and the expression of the second chatbot 106 using a cosine distance. To compute the cosine distance, system 100 may first transform both expressions into vectors using sentence embedding. For example, system 100 may transform the expressions into vectors using a sentence encoder. Once system 100 has transformed the expressions into vectors, system 100 may compute the cosine similarity of the vector of the first chatbot 106 and the vector of the second chatbot 106. To compute the cosine distance between the vector of the first chatbot 106 and the vector of the second chatbot 106, system 100 can subtract the cosine similarity value from 1.

In 306, system 100 filters the set of expressions based on the calculated mathematical distances, thereby generating a filtered set of expressions. System 100 can first determine whether a calculated mathematical distance for a pair of expressions is below a threshold value. The threshold value may be set by system 100 or by an administrator of system 100. The threshold value may be set to balance the accuracy of selection of a chatbot 106 against possible exclusions of valuable expressions. If so, system 100 can remove at least one of the expressions from the set of expressions, thereby generating the filtered set of expressions. If the goal is to have an optimal and clear separation between the expressions of chatbots 106, system 100 can remove both expressions in the pair of expressions from the set of expressions. If the goal is that certain areas of expressions should be covered by a dedicated chatbot 106 (e.g., a dedicated chatbot to handle small talk), system 100 can remove a single expression in the pair of expressions from the set of expressions. System 100 may remove the single expression in the pair of expressions from the set of expressions based on the single expression's corresponding chatbot 106 having a lower priority (e.g., lower priority value) than the other chatbot 106 corresponding to the other expression in the pair of expressions.

System 100 may also filter the set of expressions based on the calculated mathematical distances using a semi-automated approach. System 100 can first rank each pair of expressions based on their respective calculated mathematical distance. For example, system 100 can rank a pair of expressions having a lower calculated mathematical distance than another pair of expressions as having a higher priority than the other pair of expressions. System 100 can then output the ranked pairs of expressions to a user. System 100 can then filter the set of expressions based on input from the user (e.g., based on a decision from the user).

In 308, system 100 trains a machine-learning-based classification model (also referred to as a metabot model) using the filtered set of expressions. System 100 may train the machine-learning-based classification model using the filtered set of expressions using various training algorithms as would be appreciated by a person of ordinary skill in the art.

Figure 4:
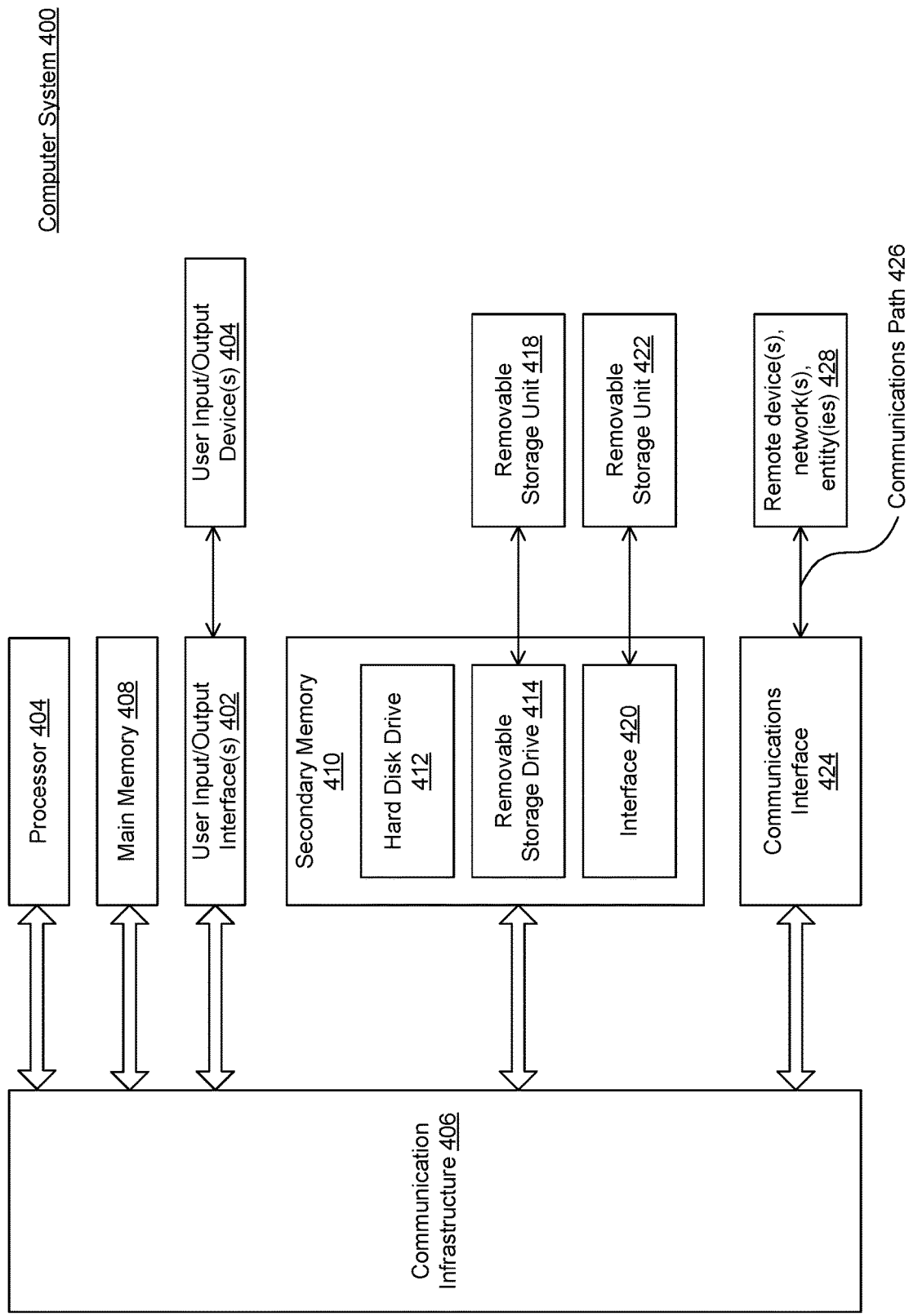
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/ any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for training a bot orchestrator for chatbot selection, comprising:
   collecting a set of expressions from a training data set of a first chatbot and a training data set of a second chatbot;
   for each respective pair of expressions in the set of expressions:
      calculating a mathematical distance between an expression for the first chatbot in the respective pair of expressions and an expression for the second chatbot in the respective pair of expressions; and
      filtering the set of expressions based on the calculated mathematical distance, thereby generating a filtered set of expressions; and
   training a machine learning-based classification model of the bot orchestrator using the filtered set of expressions, wherein the bot orchestrator is being trained to select a particular chatbot among the first and second chatbots based on the machine learning-based classification model of the bot orchestrator using the filtered set of expressions.

2. The computer implemented method of claim 1, further comprising:
   routing, using the bot orchestrator, an input to the first chatbot based on the trained machine learning-based classification model.

3. The computer implemented method of claim 1, wherein the calculating the mathematical distance between the expression for the first chatbot in the respective pair of expressions and the expression for the second chatbot in the respective pair of expressions further comprises:
   calculating the mathematical distance using a Jaccard distance.

4. The computer implemented method of claim 1, wherein the calculating the mathematical distance between the expression for the first chatbot in the respective pair of expressions and the expression for the second chatbot in the respective pair of expressions further comprises:
   converting the expression for the first chatbot into a first vector using sentence embedding;
   converting the expression for the second chatbot into a second vector using sentence embedding; and
   calculating the mathematical distance based on the first vector and the second vector.

5. The computer implemented method of claim 1, wherein the filtering the set of expressions further comprises:
   ranking each pair of expressions based on the respective calculated mathematical distance; and
   filtering the ranked pairs of expressions based on user input, thereby generating the filtered set of expressions.

6. The computer implemented method of claim 1, wherein the filtering the set of expressions further comprises:
   determining the calculated mathematical distance of a pair of expressions of the pairs of expressions is below a threshold value; and
   removing an expression for the first chatbot in the pair of expressions from the set of expressions, thereby generating the filtered set of expressions.

7. The computer implemented method of claim 6, wherein the removing the expression for the first chatbot in the pair of expressions from the set of expressions further comprises:
   removing the expression for the first chatbot in the pair of expressions from the set of expressions based on the first chatbot having a lower priority value than the second chatbot.

8. A system for training a bot orchestrator for chatbot selection, comprising:
   a memory; and
   at least one processor coupled to the memory and configured to:
      collect a set of expressions from a training data set of a first chatbot and a training data set of a second chatbot;
      for each respective pair of expressions in the set of expressions:
         calculate a mathematical distance between an expression for the first chatbot in the respective pair of expressions and an expression for the second chatbot in the respective pair of expressions; and
         filter the set of expressions based on the calculated mathematical distance, thereby generating a filtered set of expressions; and
      train a machine learning-based classification model of the bot orchestrator using the filtered set of expressions, wherein the bot orchestrator is being trained to select a particular chatbot among the first and second chatbots based on the machine learning-based classification model of the bot orchestrator using the filtered set of expressions.

9. The system of claim 8, wherein the at least one processor is further configured to:
   route, using the bot orchestrator, an input to the first chatbot based on the trained machine learning-based classification model.

10. The system of claim 8, wherein to calculate the mathematical distance between the expression for the first chatbot in the respective pair of expressions and the expression for the second chatbot in the respective pair of expressions the at least one processor is further configured to:
    calculate the mathematical distance using a Jaccard distance.

11. The system of claim 8, wherein to calculate the mathematical distance between the expression for the first chatbot in the respective pair of expressions and the expression for the second chatbot in the respective pair of expressions the at least one processor is further configured to:
    convert the expression for the first chatbot into a first vector using sentence embedding;
    convert the expression for the second chatbot into a second vector using sentence embedding; and
    calculate the mathematical distance based on the first vector and the second vector.

12. The system of claim 8, wherein to filter the set of expressions, the at least one processor is further configured to:
    rank each pair of expressions based on the respective calculated mathematical distance; and
    filter the ranked pairs of expressions based on user input, thereby generating the filtered set of expressions.

13. The system of claim 8, wherein to filter the set of expressions, the at least one processor is further configured to:
    determine the calculated mathematical distance of a pair of expressions of the pairs of expressions is below a threshold value; and
    remove an expression for the first chatbot in the pair of expressions from the set of expressions, thereby generating the filtered set of expressions.

14. The system of claim 13, wherein to remove the expression for the first chatbot in the pair of expressions from the set of expressions, the at least one processor is further configured to:

remove the expression for the first chatbot in the pair of expressions from the set of expressions based on the first chatbot having a lower priority value than the second chatbot.

15. A non-transitory computer-readable medium having instructions stored thereon that, when executed by at least one computing device, cause the at least one computing device to perform operations comprising:

collecting a set of expressions from a training data set of a first chatbot and a training data set of a second chatbot;

for each respective pair of expressions in the set of expressions:

calculating a mathematical distance between an expression for the first chatbot in the respective pair of expressions and an expression for the second chatbot in the respective pair of expressions; and filtering the set of expressions based on the calculated mathematical distance, thereby generating a filtered set of expressions; and training a machine learning-based classification model of a bot orchestrator using the filtered set of expressions, wherein the bot orchestrator is being trained to select a particular chatbot among the first and second chatbots based on the machine learning-based classification model of the bot orchestrator using the filtered set of expressions.

16. The non-transitory computer-readable medium of claim 15, wherein the operations further comprise:

routing, using the bot orchestrator, an input to the first chatbot based on the trained machine learning-based classification model.

17. The non-transitory computer-readable medium of claim 15, wherein the calculating further comprises:

calculating the mathematical distance using a Jaccard distance.

18. The non-transitory computer-readable medium of claim 15, wherein the calculating further comprises:

converting the expression for the first chatbot into a first vector using sentence embedding;

converting the expression for the second chatbot into a second vector using sentence embedding; and calculating the mathematical distance based on the first vector and the second vector.

19. The non-transitory computer-readable medium of claim 15, wherein the filtering further comprises:

ranking each pair of expressions based on the respective calculated mathematical distance; and filtering the ranked pairs of expressions based on user input, thereby generating the filtered set of expressions.

20. The non-transitory computer-readable medium of claim 15, wherein the filtering further comprises:

determining the calculated mathematical distance of a pair of expressions of the pairs of expressions is below a threshold value; and removing an expression for the first chatbot in the pair of expressions from the set of expressions, thereby generating the filtered set of expressions.

\* \* \* \* \*